(12) United States Patent
Lee et al.

(10) Patent No.: US 8,055,133 B2
(45) Date of Patent: Nov. 8, 2011

(54) TDM/WDMA PASSIVE OPTICAL NETWORK DEVICE

(75) Inventors: Dong Soo Lee, Gwangjoo (KR); Bin Yeong Yoon, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 699 days.

(21) Appl. No.: 12/145,845

(22) Filed: Jun. 25, 2008

(65) Prior Publication Data

US 2009/0103922 A1 Apr. 23, 2009

(30) Foreign Application Priority Data

Oct. 19, 2007 (KR) .................. 10-2007-0105754

(51) Int. Cl.
*H04J 14/00* (2006.01)

(52) U.S. Cl. ............................. 398/75; 398/67; 398/68

(58) Field of Classification Search .................. 398/72, 398/75, 47
See application file for complete search history.

(56) References Cited

U.S. PATENT DOCUMENTS

| 6,587,238 B1 * | 7/2003 | Shi et al. ................ 398/75 |
| 2002/0145775 A1 | 10/2002 | Effenberger et al. |
| 2005/0041971 A1 * | 2/2005 | Lee et al. ................ 398/72 |
| 2005/0259988 A1 * | 11/2005 | Jung et al. ................ 398/72 |
| 2007/0147837 A1 * | 6/2007 | Yoo et al. ................ 398/72 |

FOREIGN PATENT DOCUMENTS

KR 1020060111028 10/2006

* cited by examiner

*Primary Examiner* — Kenneth N Vanderpuye
*Assistant Examiner* — Amritbir Sandhu
(74) *Attorney, Agent, or Firm* — Nelson Mullins Riley & Scarborough LLP; EuiHoon Lee, Esq.

(57) ABSTRACT

A time division multiplex (TDM)/wavelength division multiple access (WDMA) passive optical network (PON) device includes a base station terminal, a wavelength splitter, and a subscriber terminal optical transceiver. The base station terminal includes a transmitter, an optical circulator transmitting the optical signals output from the transmitter to an optical distribution network, and a receiver demultiplexing wavelength division multiplexed upstream signals from the optical distribution network through the optical circulator. The wavelength splitter splits the downstream signals from the base station terminal to subscriber ports corresponding to wavelengths and multiplexes the optical signals received from each of the subscriber ports to the base station terminal. The subscriber terminal optical transceiver receives the downstream signals from the wavelength splitter and reuses the received downstream signals as optical sources for upstream signals.

9 Claims, 6 Drawing Sheets

TDM/WDMA PASSIVE OPTICAL NETWORK DEVICE

CROSS-REFERENCE TO RELATED PATENT APPLICATION

This application claims the benefit of Korean Patent Application No. 10-2007-0105754, filed on Oct. 19, 2007, in the Korean Intellectual Property Office, the disclosure of which is incorporated herein in its entirety by reference.

BACKGROUND OF THE INVENTION

1. Field of the Invention

The present invention relates to a passive optical network (PON) device for signal transmission between an optical line terminal (OLT) of a telephone office or a base station terminal and an optical network terminal (ONT) or an optical network unit (ONU) of a subscriber terminal in an optical subscriber network, and more particularly, to a time division multiplex (TDM)/wavelength division multiple access (WDMA) PON device in which data to be transmitted to each subscriber is multiplexed using a TDM scheme for transmission for downstream signals destined for an ONT/ONU from an OLT and signals to be transmitted from each subscriber are separately transmitted using a WDMA scheme for upstream signals destined for an OLT from an ONT/ONU.

2. Description of the Related Art

FIG. 1 is a block diagram illustrating a conventional passive optical network (PON). As illustrated in FIG. 1, in the conventional PON, an optical line terminal (OLT) 110 located in a telephone office or in a base station or a housing complex transmits a broadcast signal, a data communication signal, and a voice call signal to a subscriber over a single optical fiber. The signals sent through the single optical fiber are split by an optical splitter 120 through optical fibers connected to subscribers and are delivered to 16, 32, 64, or 128 ONTs 130 or ONUs or more. The ONT 130 or ONU converts an optical signal delivered to a subscriber terminal into an electrical signal, selects a signal dedicated_to the ONT 130 among transmitted signals, and then transmits the separated signal to the subscriber device. For signal transmission to subscribers, the PON uses a time division multiplex (TDM) scheme or a wavelength division multiplex (WDM) scheme. The TDM scheme transmits signals in different time slots for each subscribers. The WDM scheme transmits signals using different wavelengths for each subscribers.

FIG. 2 is a block diagram illustrating a conventional TDM PON. As illustrated in FIG. 2, the conventional TDM PON uses a TDM scheme in which a time division multiplexer 210 converts a plurality of downstream signals destined for subscribers into a high-speed single signal, an optical transmitter 220 modulates the converted signal into a single optical signal for transmission to the subscribers, and once the optical signal is transmitted to all the subscribers by an optical power splitter 240, each of the subscribers converts the optical signal input to an ONT into an electrical signal by using an own optical transceiver 250 and selects and receives only a downstream signal corresponding to the subscriber. For each upstream signal coming from each subscriber, a time division multiple access (TDMA) scheme is used in which the optical transceiver 250 of the subscriber transmits a signal within a time slot allocated to the subscriber to arrange the upstream signal at a corresponding point of time.

The TDM PON has been implemented using various methods such as ATM-PON, BPON, GPON, and EPON. At present, technologies capable of 1 Gb/s transmission are commonly used and PONs capable of 10 Gb/s transmission are under standardization.

In the TDM scheme, an OLT can reduce production costs compared to a wavelength division multiplex (WDM) scheme by exchanging a signal with all subscribers using the single optical transmitter 220 and an optical receiver 230. In other words, while a base station terminal requires N optical transceivers 250 for N subscribers in the WDM scheme, a base station terminal requires only one optical transmitter 220 and only one optical receiver 230 in the TDM scheme. Moreover, a broadcast or multicast signal destined for all subscribers can be transmitted to all the subscribers through a single packet in the TDM scheme. However, a transmission band is reduced because subscribers share upstream/downstream transmission bands of the optical transmitter 220 and the optical receiver 230, and a complex circuit is required for the optical receiver 230 for an upstream signal because the OLT has to receive packets of different amplitudes and phases in a burst mode format from different subscribers.

FIG. 3 is a block diagram illustrating a conventional WDM PON. As illustrated in FIG. 3, the conventional WDM PON uses, for downstream signals destined for subscribers, the WDM scheme in which the downstream signals are converted into optical signals using optical transmitters 310 which respectively have different wavelengths, the optical signals which respectively have different wavelengths are input to a single optical fiber by a wavelength division multiplexer 320 for transmission to the subscribers, a signal for each of the subscribers is separated using a wavelength splitter 340. The conventional WDM PON uses, for upstream signals transmitted from subscribers, the wavelength division multiple access (WDMA) scheme in which the upstream signals are transmitted to an OLT using optical transceivers 350 which respectively have different wavelengths.

The wavelength splitter 340 functions for downstream signals as a wavelength division demultiplexer which outputs optical signals of a plurality of wavelengths input through a port connected to the OLT to a port connected to each subscriber for each wavelength and functions for upstream signals as a wavelength division multiplexer which multiplexes an optical signal input through a port connected to each subscriber and outputs the multiplexed optical signal to a single port for transmission to the OLT.

A WDM PON is capable of 100 Mb/s-level transmission per wavelength at its early stage, and now has an increased transmission speed of up to 1 Gb/s per wavelength. Although the WDM PON may use different wavelengths for an upstream signal and a downstream signal for each subscriber, a remodulation scheme for generating an upstream optical signal by re-using a downstream optical signal as an optical source is also used as an approach for reducing costs by reducing the number of optical sources. As an example of the remodulation scheme, a method of remodulating a downstream optical signal modulated at a high speed of 10 Gbit/s to generate an upstream optical signal modulated at a low speed of 1 Gbit/s is used in the paper titled "Demonstration of Data Remodulation for Upstream Traffic in WDM Access Networks Using Injection-Locked FP Laser as Modulator" published by L. Y. Chan, et. al, in the Optical Fiber Communication Conference and Exhibit in 2001.

According to the WDM scheme, a subscriber can transmit a signal up to the transmission bands of the optical transmitter 310 and of an optical receiver 360 of the OLT because the optical transmitter 310 and the optical receiver 360 are allocated to each subscriber at a base station terminal. Furthermore, a circuit of the optical receiver 360 for an upstream signal is simplified because a packet transmitted from each subscriber to the OLT is in a continuous mode format. However, production costs increase because the numbers of optical transmitters 310 and optical receivers 360 of the OLT are the same as the number of subscribers, and the OLT has to repetitively transmit a downstream signal such as a broadcast signal at the same time to the subscribers because an optical splitter cannot perform transmission in a broadcast or multicast manner.

SUMMARY OF THE INVENTION

In order to make up for the disadvantages of a conventional TDM PON and a conventional WDM PON, the present invention provides a TDM/WDMA PON device in which a TDM scheme is applied to a downstream signal by reducing the number of optical transmitters, thereby simplifying transmission of a downstream signal such as a broadcast signal received by subscribers at the same time, and each subscriber uses an independent channel for a upstream signal by using a WDMA scheme, thereby sufficiently using the frequency band of an optical transceiver.

According to an aspect of the present invention, there is provided a time division multiplex (TDM)/wavelength division multiple access (WDMA) passive optical network (PON) device. The TDM/WDMA PON device includes a base station terminal, a wavelength splitter, and a subscriber terminal. The base station terminal includes a transmitter time-division-multiplexing and simultaneously modulating and outputting a plurality of different wavelength optical signals, an optical circulator transmitting the optical signals received from the transmitter to an optical distribution network and transmitting optical signals received from the optical distribution network_to a receiver, and the receiver demultiplexing wavelength division multiplexed upstream signals from the optical distribution network through the optical circulator, converting the demultiplexed upstream signal into a plurality of electrical signals, and delivering the electrical signals to an upper layer. The wavelength splitter splits the downstream signals from the base station terminal to subscriber ports corresponding to wavelengths and multiplexes the optical signals received from each of the subscriber ports to the base station terminal. The subscriber terminal optical transceiver receives_the downstream signals from the wavelength splitter and remodulates the received downstream signals to upstream signals.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
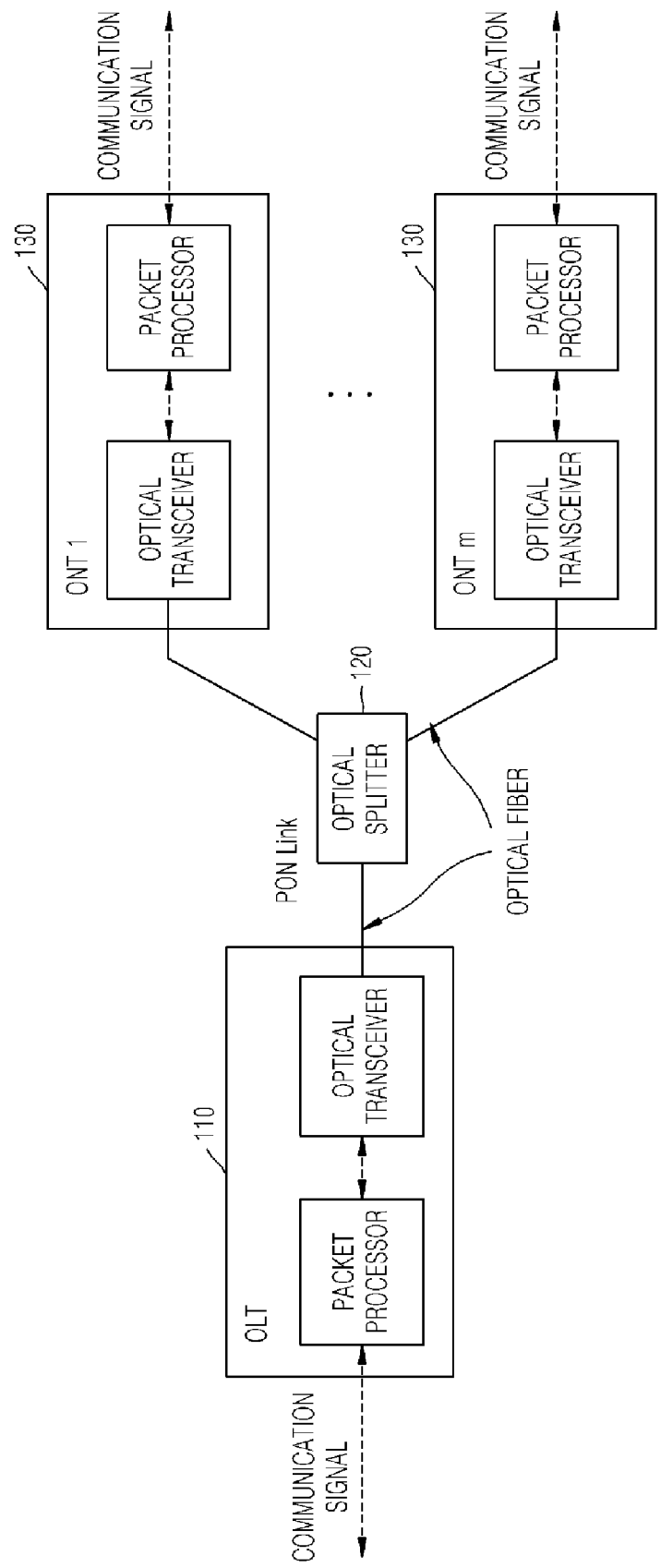
FIG. 1 is a block diagram illustrating a conventional passive optical network (PON)
Figure 2:
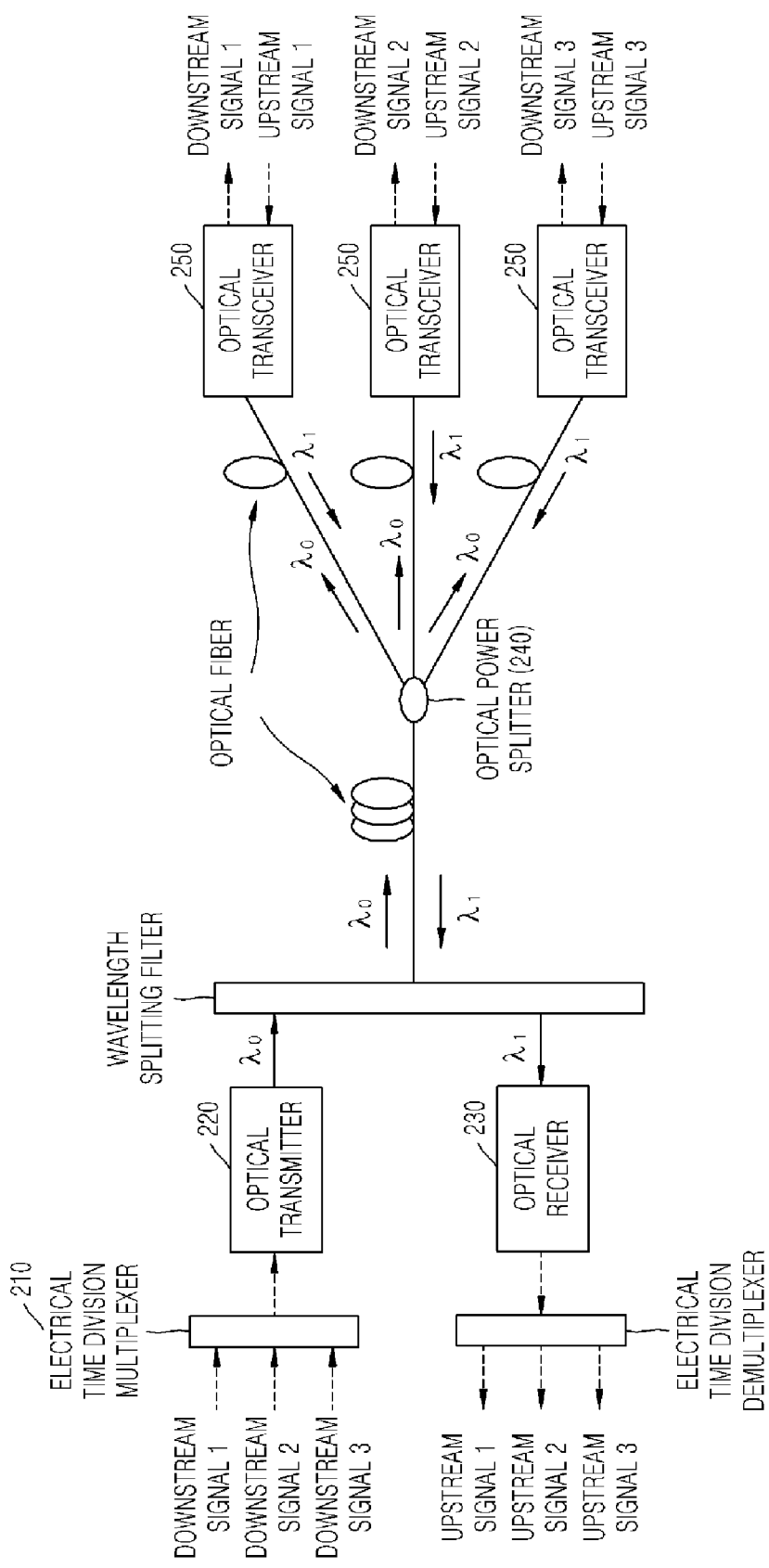
FIG. 2 is a block diagram illustrating a conventional time division multiplex (TDM) PON.
Figure 3:
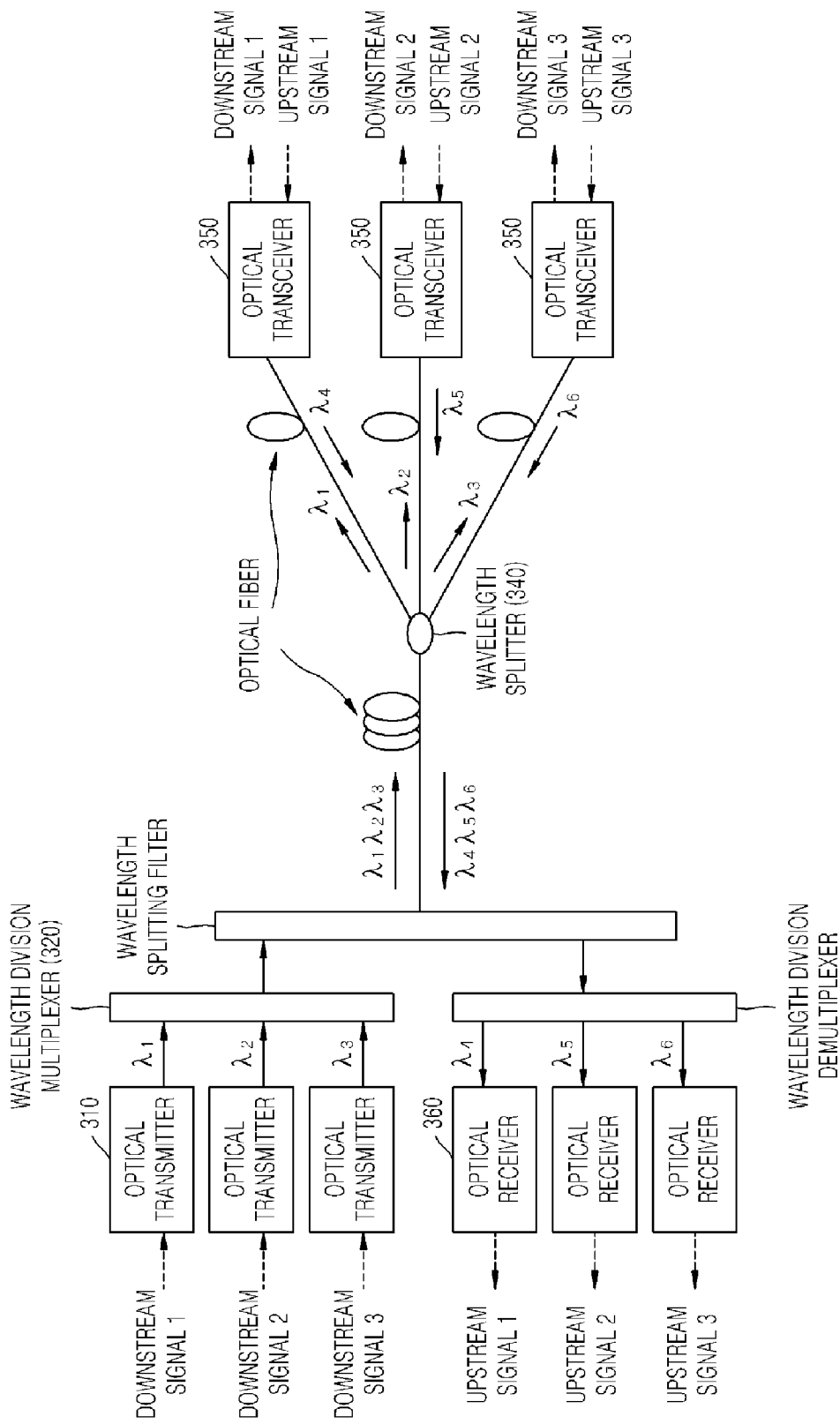
FIG. 3 is a block diagram illustrating a conventional wavelength division multiplex (WDM) PON.

Hereinafter, an embodiment of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 4:
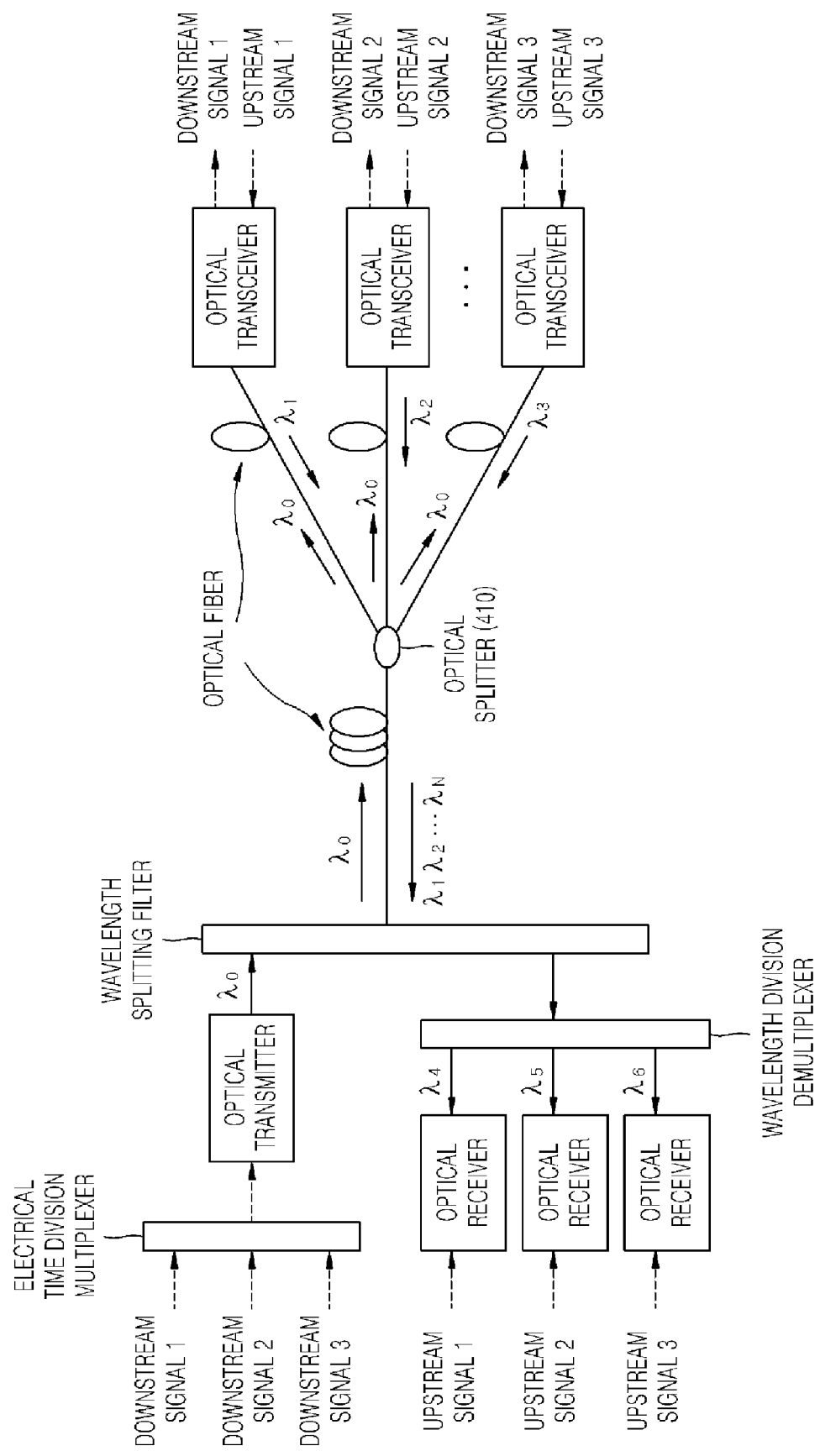
FIG. 4 is a block diagram illustrating a conventional TDM/wavelength division multiple access (WDMA) PON.

FIG. 4 is a block diagram illustrating a conventional time division multiplex (TDM)/wavelength division multiple access (WDMA) passive optical network (PON).

A technical issue to be addressed by the present invention for a TDM/WDMA PON is how to efficiently implement a TDM scheme and a WDMA scheme in the same optical network.

The conventional TDM scheme uses an optical power splitter 240 for splitting an optical signal for subscribers in an optical network. Since the optical power splitter 240 splits the power of an optical signal having a single wavelength for transmission through ports, the optical signal is transmitted to an optical network terminal (ONT) after its power is reduced according to the number of ports of the optical power splitter 240. On the other hand, in the conventional WDMA scheme, an optical signal input through a port corresponding to its wavelength by a wavelength splitting filter (340) is multiplexed and then transmitted through a port connected to an optical line terminal (OLT).

Referring to FIG. 4, when an optical power splitter 240 is used as an optical splitter 410 of the TDM/WDMA PON, the same signal having an optical power can be transmitted to all subscribers as in a TDM PON for downstream signals having the same wavelength, but optical powers of a plurality of wavelengths transmitted from the subscribers are reduced according to the number of ports of the optical splitter for upstream signals, degrading efficiency. When a wavelength splitter 340 is used as the optical splitter 410 of the TDM/WDMA PON, it is impossible to transmit downstream signals of a single wavelength to all the subscribers.

Hereinafter, the present invention capable of solving these problems will be described with reference to FIGS. 5 and 6.

Figure 5:
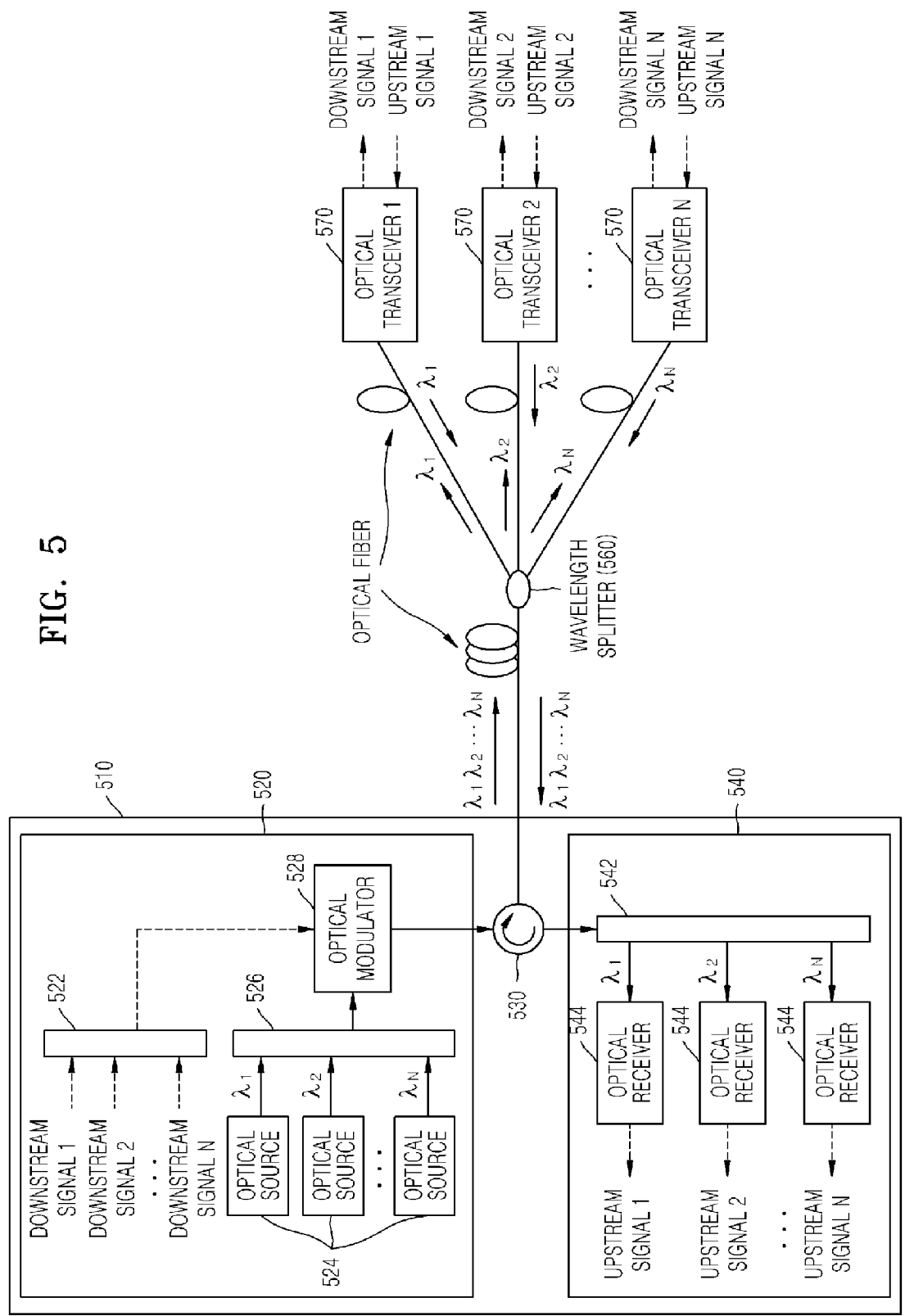
FIG. 5 is a block diagram illustrating a TDM/WDMA PON device, according to an embodiment of the present invention.

FIG. 5 is a block diagram illustrating a TDM/WDMA PON device, according to an embodiment of the present invention.

Referring to FIG. 5, the TDM/WDMA PON device comprises a base station terminal 510, a wavelength splitter 560, and a subscriber terminal optical transceiver 570.

The base station terminal 510 comprises a transmitter 520, an optical circulator 530, and a receiver 540. The transmitter 520 performs TDM on a plurality of downstream signals and modulates a plurality of optical signals.

The transmitter 520 comprises an electrical time division multiplexer 522, a plurality of optical sources 524, a wavelength division multiplexer 526, and an optical modulator 528.

The electrical time division multiplexer 522 multiplexes a plurality of downstream signals to a single high-speed signal, thereby outputting the multiplexed downstream signals to drive the optical modulator. The plurality of optical sources 524 output optical signals having the plurality of wavelengths. It is preferable that the optical sources 524 be a wavelength division multiplex (WDM) optical source array having a single multiplexing output port.

The plurality of optical sources 524 may be an optical source having a frequency of a dense wavelength division multiplex (DWDM) wavelength as prescribed in international telecommunication union-telecommunication standardization sector (ITU-T) G.694.1 Spectral Grids for WDM Applications: DWDM frequency grid, or be an optical source having a frequency of a coarse wavelength division multiplex (CWDM) wavelength as prescribed in ITU-T G.694.2 Spectral Grids for WDM Applications: CWDM wavelength grid.

The wavelength division multiplexer 526 multiplexes the optical signals from the plurality of optical sources 524 to output a multiplexed signal.

The optical modulator 528, which is driven by the high-speed signal, modulates the multiplexed signal output from the wavelength division multiplexer 526 to output an optical signal in which the downstream signals that have been electrically time division multiplexed are modulated on the plurality of wavelengths.

In the TDM/WDMA PON device, according to an embodiment of the present invention, for downstream signals, electrical signals delivered from an upper layer are multiplexed into a single high-speed signal by the electrical time division multiplexer 522 to drive the optical modulator 528. Furthermore, the optical modulator 528 simultaneously modulates the optical signals output from the plurality of optical sources 524.

Here, the signal modulated by the optical modulator 528 is the optical signal in which the downstream signals that have been time division multiplexed are modulated on the plurality of wavelengths using the same modulation method. In other words, received optical signals of any wavelength are extracted as the same signal.

The plurality of optical sources 524 are multiplexed by the wavelength division multiplexer 526 of an arrayed waveguide grating (AWG) type to a single optical fiber or an optical wave guide and thus are connected to an input port of the optical modulator 528. Alternatively, the plurality of optical sources 524 may be connected to the optical modulator 528 using a WDM optical source array having a single multiplexing output port. Alternatively, the optical modulator 528 and the plurality of optical sources 524 may be integrated onto a single substrate. In this case, the substrate having the optical modulator 528 and the optical sources 524 integrated thereonto may be implemented by integrating the plurality of optical sources 524 in a chip form, the wavelength division multiplexer 526 connected to the optical sources 524, and the optical modulator 528 in a chip form connected to an output port of the wavelength division multiplexer 526 onto a planar lightwave circuit (PLC) platform. Alternatively, the substrate may be implemented by integrating the plurality of optical sources 524 in a chip form, the wavelength division multiplexer 526 connected to the optical sources 524, and the optical modulator 528 of a Mach Zehnder type connected to the output port of the wavelength division multiplexer 526 onto the PLC platform.

The transmitter 520 of the base station terminal 510 may further comprise an optical amplifier at the output port.

The downstream signals are delivered to an optical distribution network through the optical circulator 530 and are split to a port corresponding to each wavelength by the wavelength splitter 560 on the optical distribution network of the PON device for transmission to corresponding subscribers.

The optical circulator 530 transmits the optical signal output from the transmitter 520 to the optical distribution network, transmits an optical signal received from the optical distribution network to the optical receiver 540, and appropriately blocks transmission of the optical signal output from the transmitter 520 to the optical receiver 540.

The optical receiver 540 demultiplexes an input upstream signal transmitted from the optical distribution network through the optical circulator 530 and converts the demultiplexed upstream signals into a plurality of electrical signals for transmission to an upper layer.

The optical receiver 540 comprises a wavelength division demultiplexer 542 and a plurality of optical receivers 544.

The wavelength division demultiplexer 542 demultiplexes an input upstream signal transmitted from the optical distribution network.

The plurality of optical receivers 544 convert outputs of the wavelength division demultiplexer 542 into electrical signals for transmission to an upper layer. Preferably, each of the plurality of optical receivers 544 is a photo detector array.

The optical receiver 540 demultiplexes an input upstream signal transmitted from the optical distribution network through the wavelength division demultiplexer 542 of an AWG type, converts an optical signal corresponding to each subscriber into an electrical signal through each optical receiver 544 connected to each output port of the wavelength division demultiplexer 542, and transmits the electrical signal to an upper layer. The optical receiver 540 may be implemented by comprising a plurality of photo detector arrays and the single wavelength demultiplexer 542 or integrating a plurality of photo detector arrays and the single wavelength demultiplexer 542 onto a single PLC platform.

The base station terminal 510 may further comprise an optical amplifier (not shown) between an optical distribution network and the optical circulator 530.

The wavelength splitter 560 splits the downstream signal output from the base station terminal 510 to subscriber ports corresponding to each wavelength and multiplexes the optical signal received from each of the subscriber ports to the base station terminal 510.

The subscriber terminal optical transceiver 570_receives the downstream signal from the wavelength splitter 560 to remodulate the received downstream signal into an upstream signal.

Figure 6:
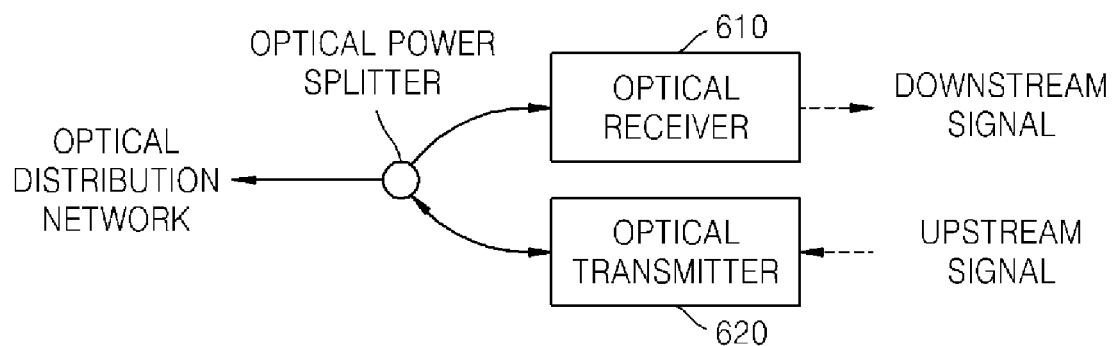
FIG. 6 is a detailed block diagram illustrating an example of an optical transceiver for a subscriber terminal illustrated in FIG. 5.

FIG. 6 is a detailed block diagram illustrating an example of the subscriber terminal optical transceiver 570 illustrated in FIG. 5. Referring to FIG. 6, the subscriber terminal optical transceiver 570 comprises an optical receiver 610, an optical transmitter 620, and an optical power splitter 630.

The optical receiver 610 receives the downstream signal from the wavelength splitter 560. The optical transmitter 620 receives the downstream signal and re-modulates the received downstream signal into an upstream signal. The optical power splitter 630 splits the power of the input downstream signal to output a portion of the power to the optical receiver 610 and to output the remaining portion through a port connected to the optical transmitter 620. The optical power splitter 630 may be implemented using an optical fiber coupler, an optical wave guide coupler, or a thin film filter.

The upstream signal obtained by re-modulating the optical transmitter 620 is transmitted through a port connected to the optical transmitter 620, i.e., the port through which the downstream signal is received, and then is delivered to the wavelength splitter 560. At this time, the upstream signal may experience partial power loss due to the optical power splitter 630.

The optical transmitter 620 inputs therein an optical signal through a single input/output port and outputs an optical signal which is remodulated into an upstream signal and is amplified at the same time. The optical signal output from the optical transmitter 620 is transmitted through the port connected to the optical distribution network to be delivered to the base station terminal 510 through the wavelength splitter 560.

In the TDM/WDMA PON device, according to an embodiment of the present invention, signals destined for all subscribers are time-division multiplexed and transmitted for downstream signals and signals transmitted from all the subscribers are transmitted through different wavelengths for upstream signals, thus resulting in a downstream signal transmission band that is greater than an upstream signal transmission band. For example, as implemented in a WDM PON, a transmission band capable of securing 1 Gb/s per wavelength may be used for the upstream signals as implemented in a WDM PON and a transmission band capable of securing 10 Gb/s per wavelength may be used for the downstream signals. In this case, transmission bands used by an optical transceiver can secure 10 Gb/s for downstream signals and 1 Gb/s for upstream signals. At this time, for the downstream signals, the output power of the optical transmitter 520 of the base station terminal 510 needs to be increased to obtain the same optical link budget as that for the upstream signals.

To this end, the TDM/WDMA PON device, according to an embodiment of the present invention, uses an optical amplifier such as an optical fiber amplifier or a semiconductor optical amplifier between the output port of the optical transmitter 520 and the port of the optical circulator 530 connected to the optical transmitter 520. Alternatively, by connecting the optical amplifier to the port of the optical circulator 530 connected to the optical distribution network, optical transmission power may be improved. Here, if the optical amplifier connected between the optical circulator 530 and the optical distribution network is of a bidirectional type, it can improve the optical link budge of the PON device by simultaneously amplifying the upstream signals and the downstream signals.

As described above, according to the current embodiment of the present invention, in providing a way to efficiently implement a TDM scheme and a WDMA scheme in the same PON, a base station terminal transmits a downstream signal by using an optical transmitter having a plurality of optical sources and an optical circulator and receives a wavelength-division multiplexed upstream signal by using a plurality of optical receivers, thereby solving a problem in which TDM PON cannot transmit downstream signals having a single wavelength to subscribers when it uses a wavelength splitter as an optical splitter.

Moreover, by using both the TDM scheme and the WDMA scheme, a PON can improve band efficiency regarding upstream signals and simplify a complex circuit for transmission/reception of an upstream signal when compared to using only the TDM scheme. Furthermore, when compared to a PON using only a WDM scheme, cost reduction can be achieved by reducing the number of optical transmitters for downstream signals from N to 1, and packet transmission can be performed in a broadcast or multicast manner in which all subscribers can receive data such as broadcast data at the same time.

While the present invention has been particularly shown and described with reference to an embodiment thereof, it will be understood by those of ordinary skill in the art that various changes in form and detail may be made therein without departing from the spirit and scope of the present invention as defined by the following claims.

What is claimed is:

1. A time division multiplex (TDM)/wavelength division multiple access (WDMA) passive optical network (PON) device comprising:
  a base station terminal comprising:
    a transmitter electrically-time-division-multiplexing a plurality of downstream signals into a single high-speed electrical signal, modulating a plurality of wavelengths simultaneously with the single high-speed electrical signal, and outputting a plurality of optical signals corresponding to the plurality of wavelengths;
    an optical circulator transmitting the optical signals received from the transmitter to an optical distribution network and transmitting optical signals received from the optical distribution network; and
    a receiver demultiplexing wavelength division multiplexed upstream signals from the optical distribution network through the optical circulator, converting the demultiplexed upstream signal into a plurality of electrical signals, and delivering the electrical signals to an upper layer;
  a wavelength splitter splitting the downstream signals from the base station terminal to subscriber ports corresponding to wavelengths and multiplexing the optical signals received from each of the subscriber ports to the base station terminal; and
  a subscriber terminal optical transceiver receiving the downstream signals from the wavelength splitter and remodulating the received downstream signals to upstream signals.

2. The TDM/WDMA PON device of claim 1, wherein the transmitter of the base station terminal comprises:
  a plurality of optical sources outputting optical signals having the plurality of wavelengths;
  a wavelength division multiplexer multiplexing the optical signals output from the plurality of optical sources to output a multiplexed signal; and
  an optical modulator driven by the high-speed signal, and modulating the multiplexed signal output from the wavelength division multiplexer to output an optical signal in which an electrically time division multiplexed downstream signal is modulated to the plurality of wavelengths.

3. The TDM/WDMA PON device of claim 1, wherein the transmitter of the base station terminal comprises an optical amplifier at an output port of the transmitter.

4. The TDM/WDMA PON device of claim 2, wherein the plurality of optical sources are an WDM optical source array comprising a single multiplexing output port.

5. The TDM/WDMA PON device of claim 1, wherein the base station terminal further comprises an optical amplifier between an optical distribution network and the optical circulator.

6. The TDM/WDMA PON device of claim 1, wherein the receiver of the base station terminal comprises:
  a wavelength division demultiplexer demultiplexing the input upstream signal transmitted from the optical distribution network; and
  a plurality of optical receivers converting an output of the wavelength division demultiplexer into the plurality of electrical signals and delivering the electrical signals to the upper layer.

7. The TDM/WDMA PON device of claim 6, wherein each of the plurality of optical receivers is a photo detector array.

8. The TDM/WDMA PON device of claim 1, wherein the subscriber terminal optical transceiver comprises:
  an optical receiver receiving the downstream signal from the wavelength splitter;
  an optical transmitter redmodulating the received downstream signal into the upstream signal; and
  an optical power splitter splitting the power of the input downstream signal to output a portion of the power to the optical receiver and output the remaining portion through a port connected to the optical transmitter.

9. The TDM/WDMA PON device of claim 8, wherein the optical power splitter is implemented using an optical fiber coupler, an optical wave guide coupler, or a thin film filter.

* * * * *